J. M. FOY.
Corn-Planter.
No. { 1,052, 32,056. }
Patented Apr. 16, 1861.
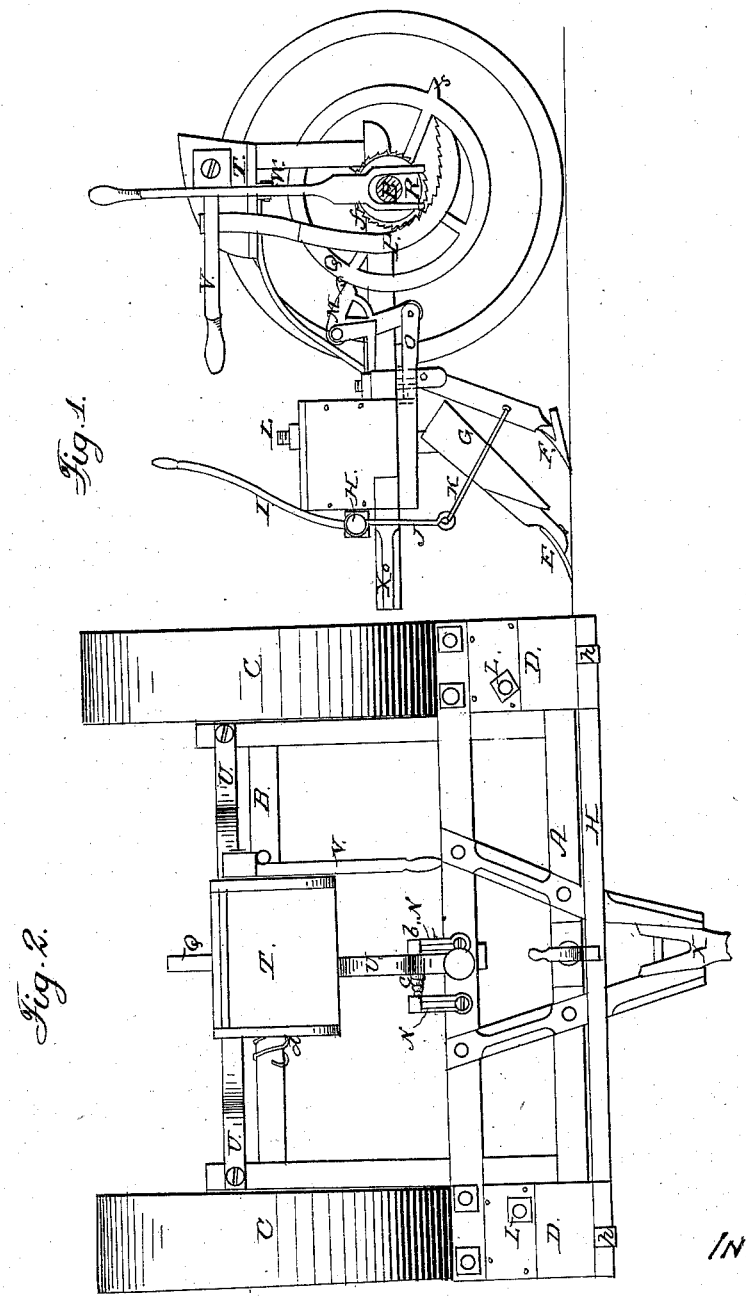

UNITED STATES PATENT OFFICE.

JAMES M. FOY, OF FOUNTAIN GREEN, ILLINOIS.

IMPROVEMENT IN CORN-PLANTERS.

Specification forming part of Letters Patent No. 32,056, dated April 16, 1861.

*To all whom it may concern:*

Be it known that I, JAMES M. FOY, of Fountain Green, in the county of Hancock and State of Illinois, have invented a new and Improved Corn-Planter; and I do hereby declare that the following is a full, clear, and exact description of the same, reference being had to the accompanying drawings, making part of this specification, in which—

Figure 1 is a side elevation with the nigh wheel removed. Fig. 2 is a plan.

Similar letters of reference indicate corresponding parts in both figures.

The nature of this invention consists in a combination of devices by means of which the seeding apparatus is at all times under the complete control of the driver, and can be made to drop at regular intervals or otherwise, as desired, in the manner hereinafter more fully explained.

A represents the framing of the machine, supported at its rear end upon a shaft, B, which is journaled in boxes attached to the under side of the framing.

C C are traction-wheels journaled loosely on and near the outer ends of the shaft B. Attached to the outer side of the wheels, near their axis, is a spring-point, (not shown in the drawings,) which, as the machine is drawn forward, engages in ratchet-teeth in a disk rigidly secured upon the extreme outer ends of the shaft B, and when pushed backward slips over the ratchet-teeth, and thereby allows the wheels in their retrograde movement to revolve independently of the shaft and seed-dropping mechanism.

D D are seed-hoppers secured upon the forward part of the machine to the framing immediately in front of traction-wheels.

E E are furrow-plows, hinged to the under side of the hoppers in front of and midway between two inwardly-flaring covers, F F, also hinged to the under side of the seed-hoppers.

G is a seed tube or conveyer attached to the back part of the furrow-plow, and communicates with the hopper.

H is a transverse shaft journaled in boxes $h$, attached to the front side of the hopper, so as to be capable of vibratory movement.

I is a lever attached to the said shaft for the purpose of adjusting the furrow-plows and coverers.

J J are rods attached to the shaft H, and projecting downwardly and terminating in eyes, which are connected to the furrow-plow and coverers by connecting-rods K K.

L L are shafts passing vertically through the seed-hoppers. Journaled on the lower end of the said shafts, in each of the hoppers, is a perforated disk-valve, which is provided with a radial arm and connected thereby to the ends of the sliding cross-piece. (Shown in dotted lines.)

M is a pallet-lever secured upon and near one end of an arbor, $b$, pivoted at each end in brackets N N, attached to and supported upon one of the transverse pieces of the framing. The lower end of the pallet-lever is connected to the sliding bar by a rod, O.

$c$ is a spiral spring wound around and attached to the arbor at one end and to the bracket N' at the other.

Q is a wheel fitted loosely on the shaft B, so as to be capable of lateral and rotary movement thereon independently of the shaft.

R is a disk fitted on the shaft so as to have lateral movement only independent of the shaft. The inner side of the said disk is provided with ratchet-teeth, which engage in corresponding teeth in the side of the hub of the wheel, with which it comes in contact, thereby imparting a rotory motion to the dropping-wheel.

On the periphery of the wheel Q, and equidistant apart, are two or more projections, $s$, which, when the machine is in operation, impinge against the short arm of the pallet-lever, and by means of its connection with the sliding bar and the recoil of the spiral spring $c$ imparts an intermittent vibratory motion to the seed-valves. On the face of the hub of the wheel are also ratchet-teeth $f$, in which a sickle-shaped ratchet-bar, B, eagages to give a rotary motion to the wheel independently of the motion of the machine.

T is a seat mounted upon braces U, supported upon the framing of the machine.

V is a lever, to which the sickle-ratchet P is attached.

Pivoted to one side of the seat W is also a lever, having its fulcrum in an arm attached to and projecting from one side of the seat. The lower end of the lever W is forked, and fits over the shaft and in contact with the disk R, for the purpose of moving it and the wheel laterally on the shaft B, so as to allow the wheel to revolve without coming in contact with the pallet-lever. A spiral spring, d, fixed at one end to the shaft B and pressing against the side of the wheel opposite of the forked lever, serves to return the wheel to its working position on the shaft when the lever is released.

X is the draft-pole.

This machine is designed to plant two rows at once.

The operation of my machine is as follows: As the machine is drawn over the ground motion is imparted from the traction-wheels to the dropping-wheel through the medium of shaft and ratchet-disk secured thereon. At every revolution of the dropping-wheel the seed-valves are caused to move twice by means of the projections on the dropping-wheel striking against the short arm of the pallet-lever and pressing it down until the distance between it and the wheel is sufficient to allow the projection to pass, from whence it is returned to its normal position by the recoil of its spiral spring. At each movement of the valves the requisite quantity of seed is brought over the seed-tube, and thereby conveyed to the furrow formed by the plow. The plow and coverers are adjusted simultaneously by the driver without moving from his seat. When it is desired to transport the machine, the dropping-wheel is moved laterally on the shaft by the forked lever, thereby permitting it to revolve without contact with the pallet-lever. By means of the sickle ratchet-bar the dropping-wheel is under the perfect control of the driver. During any backward movement of the machine the traction-wheels, by means of their ratchet-connections, are adapted to rotate without any movement of the shaft.

What I claim as my invention, and desire to secure by Letters Patent, is—

1. The combination and arrangement of the sickle-shaped bar P, lever V, ratchet-teeth f, and dropping-wheel Q, as and for the purposes set forth.

2. The arrangement of the dropping-wheel Q, ratchet-disk R, spiral spring d, shaft B, and forked lever W, in combination with the pallet-lever M, in the manner and for the purposes set forth.

JAMES M. FOY.

Witnesses:
DANIEL WHITE,
JAMES CAMPBELL.